Oct. 28, 1958
D. M. POWERS
2,857,947
FOOD CONTAINER
Filed Feb. 8, 1957
2 Sheets-Sheet 2
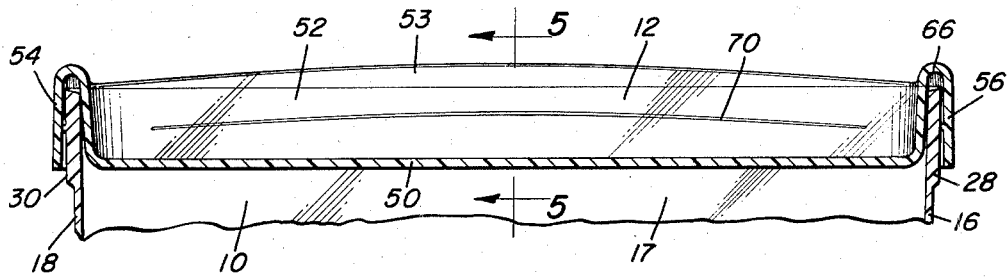
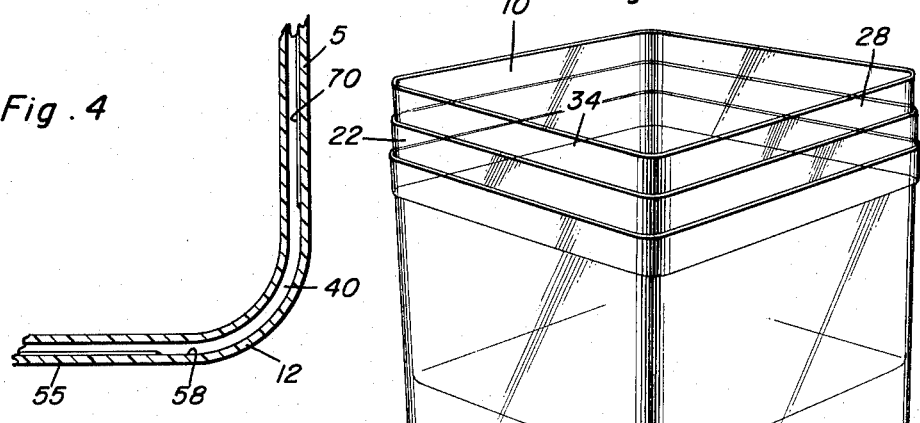
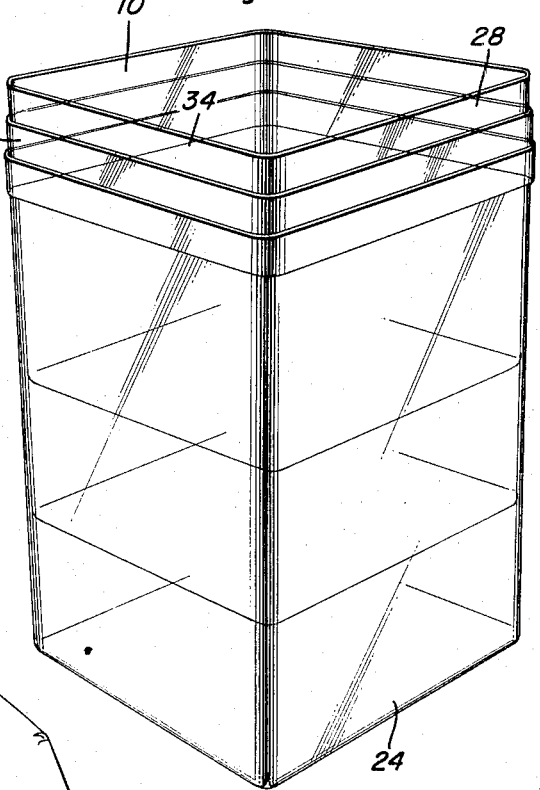
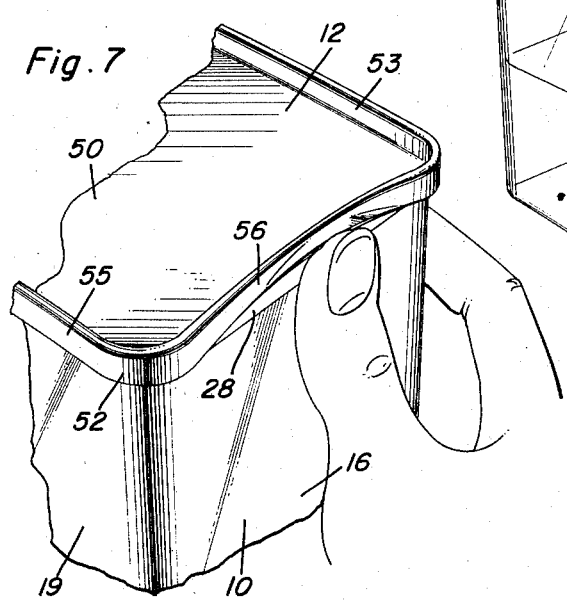
Don M. Powers
INVENTOR.
BY *Clarence A. O'Brien*
*and Harvey B. Jackson*
Attorneys

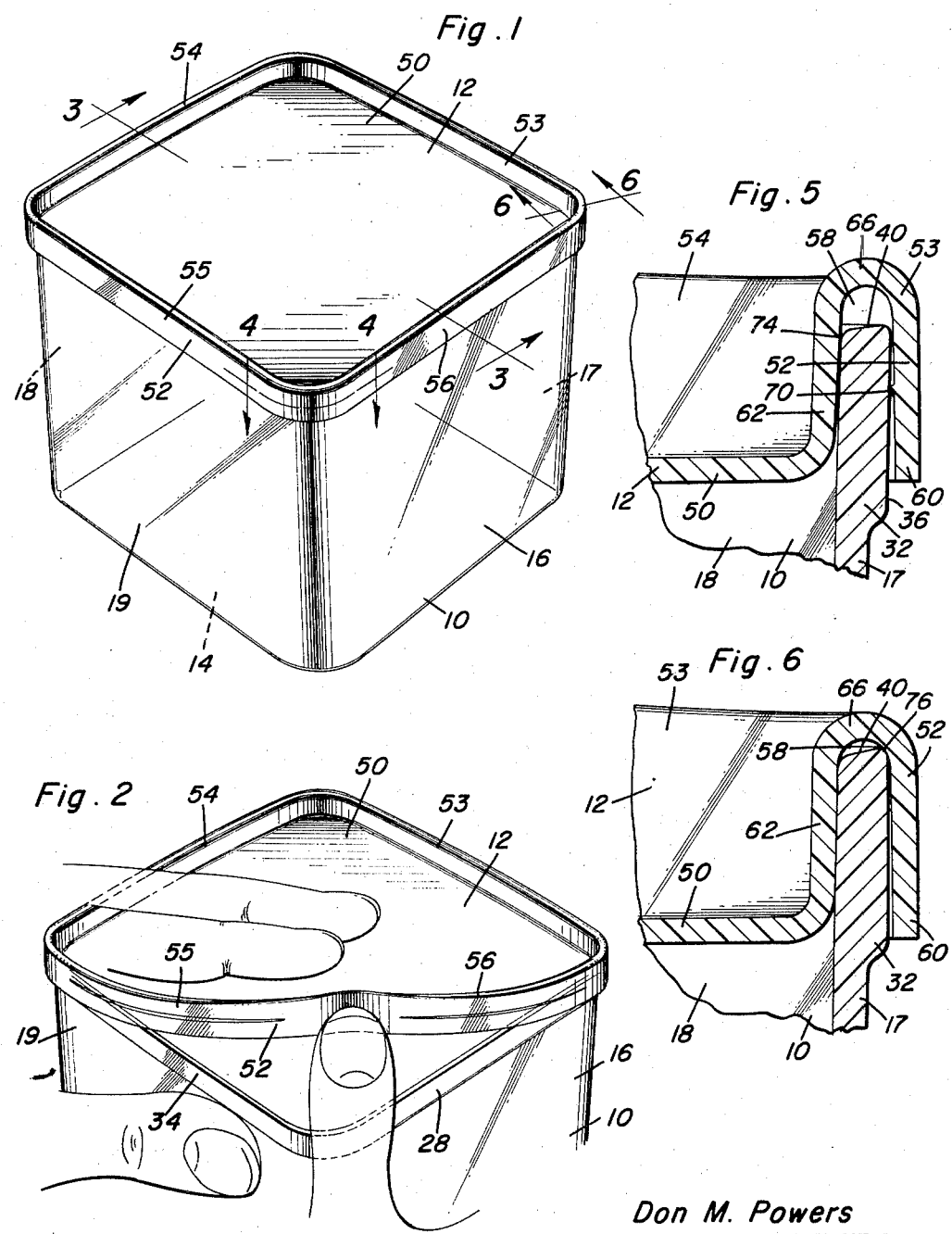

United States Patent Office 2,857,947
Patented Oct. 28, 1958

2,857,947

FOOD CONTAINER

Don M. Powers, Burlington, N. C.

Application February 8, 1957, Serial No. 639,139

12 Claims. (Cl. 150—.5)

This invention relates to a container and cover for the container and more particularly to a container and cover combination with a novel interaction between the cover and container, making it easy to separate the cover from the container and yet, when the cover is on the container, have an exceedingly effective air and liquid seal between the two parts.

I am aware of prior plastic containers that have covers made of a flexible, rubber-like thermo plastic composition. Usually, the material is one of the several commercially available polyethylenes, and the covers are each formed with a sealing groove at their periphery or perimeter. The upper edge of the container side wall fits in the groove, holding the cover in place by the frictional bond between comparatively wide areas of contact of the side walls of the groove and the container. Others remain assembled by interfitted locking beads or ledges. In either case, those containers whose covers form an effective seal therewith are difficult to handle in both opening and closing procedures, particularly the former.

Moreover, in applying many polyethylene covers to containers, there is a reasonably tight air seal formed between the cover and container. In separating the cover from the container, a low partial vacuum is formed in the container, opposing the separation of the cover from the container. This vacuum has to be relieved before the cover is released from the container, further adding to the difficulty encountered in removing the cover from its container.

Manufacturers have devised structures for aiding in the removal of flexible covers. One such structure is the corner tab or finger grip. There are a number of different forms of tabs or grips. Other flexible containers are squeezed or distorted while pulling the cover so that the cover is actually "peeled" from the container. While these structural expedients will work, my invention provides a new organization of cover and container which operates much more smoothly and easily without sacrificing anything in the way of effective sealing between the parts.

Accordingly, an object of the invention is to provide a flexible and reasonably elastic cover for a container, wherein the cover cooperates with the container to form a satisfactory seal between the cover and the container and yet the cover is more easily separable from the container without resorting to mechanical contrivances or objectionably protruding tabs or crushing the container body.

A more specific object of the invention is to provide a flexible cover with a downwardly opening groove in which the upper edges of the side walls of the container are fitted, the groove being slightly longitudinally arched so that it seats on the upper edges of the container side walls at spaced places. In this way, the highest parts of two adjacent arches in the grooves form flexure areas which yield by moving toward the upper edges of the side walls of the container when the part of the cover which is in contact with the upper edge of a side wall and which is in between the previously mentioned pair of arches is lifted from the container. The result is that only a small force, but in a proper direction, is required to separate a part of the cover from the container, and once this happens, the previously described partial vacuum is not formed and the flexible and elastic cover is easily separated from the container by having the sides of the groove slide over the container sides.

In embodiments of the invention where the container is polygonal in cross section, it is suggested that the arches be arranged from corner to corner, so that the parts of the groove which seat upon the upper edges of the side walls of the container are at the corners. Upon lifting one of the corners in a polygonal cover, the center parts of the arches between the corners of two adjacent walls are automatically pulled downwardly as the corner is elevated in performing the cover separating operation.

Containers of the type with which the invention deals are used principally for the storage of food. Accordingly, it is desirable to have an effective seal between the cover and the container side walls. My invention achieves this in part by having a fine rib on one inner surface of the arched groove, there being one rib for each container side wall, the rib being in contact with a surface of one of the side wall of the container. The rib terminates short of the parts of the groove which seat upon the upper surface of the container side walls, thereby leaving these parts free to be easily lifted from the container. The inherent elasticity of the cover applies a force on this small rib, pressing it quite firmly against one side wall of the container, with the result that the rim of the cover tends to cock very slightly, causing localized high pressure contact around the inner peripheral edges of the container side walls. Therefore there is a coaction between the rib and the upper inner edge of one side wall of the container, resulting in a more effective air and liquid seal obtained wholly by the design of the cover rim and the upper edges of the container side walls.

Another object of the invention is to provide a container and cover for the container which is not only capable of more effectively sealing the contents of the container and more easily separating the cover from the container, but of such construction that both parts are capable of practical manufacture. For example, the upper edges of the side walls of the container slope downwardly and inwardly for ease of removal of the piece part from the core when the container is made by a molding process. In addition to this, the sloped upper surface of each of the container side walls cooperates with the rib on a groove side wall for a better liquid and air seal and also cooperates with the inner wall and top inside radius of the closure to add to the sealing function. All of the other shapes, curvatures and formations of both the cover and container are such as to be practical from a modern manufacturing standpoint.

Other objects and features will become apparent in following the description of the illustrated embodiment of the invention.

In the drawings:

Figure 1 is a perspective view of a container and closure exemplifying the principles of the invention;

Figure 2 is a fragmentary, perspective view of the container and closure in Figure 1, showing the same being opened by the suggested method;

Figure 3 is an enlarged, fragmentary, sectional view taken on the line 3—3 of Figure 1;

Figure 4 is a fragmentary, sectional view taken horizontally through one corner of the container and closure of Figure 1 and taken approximately on the line 4—4 thereof;

Figure 5 is an enlarged, fragmentary, sectional view taken on the line 5—5 of Figure 3 and showing principally the arched part of the groove in the cover rim, together with the rib which coacts with the upper edge of one of the container side walls in the sealing function of the cover;

Figure 6 is an enlarged, fragmentary, sectional view taken on the line 6—6 of Figure 1 and showing the interfitting of the cover and container at a corner thereof;

Figure 7 is a fragmentary, perspective view showing difficulty being encountered in attempting to separate the cover from the container at an intermediate part of the arch along one side wall; and Figure 8 is a perspective view showing that the container may be made of different sizes and that by having tapered side walls they may be nested for storage and transportation.

In the accompanying drawings there is a container 10 together with its closure 12. The cover and/or the container are made of a plastic elastomer, such as polyethylene, or some other material that has like characteristics. The other materials which may be used would be rubber-like, flexible and elastic, but with a low recovery rate after distortion. Container 10 has a bottom 14, and four side walls 16, 17, 18 and 19 respectively. The side walls have rounded corners and are integrally joined at their lower edges with the bottom 14. In addition, the side walls slope outwardly slightly as they rise from the edges of the bottom, whereby a plurality of the containers are readily nested. For example, Figure 8 shows container 10 nested in container 22, while container 22 is fitted within container 24. Containers 22 and 24 are made larger in height than container 10 so that there is ample room for the nesting of two or more of the containers. Although containers 10, 22 and 24 are polygonal in cross section, the principles of the invention are equally applicable to containers which are circular or oval in cross section or of some other shape.

The upper edges of the side walls have an outwardly protruding offset or bead that is cooperable with the cover in separably holding the cover on the container. There are offset parts 28 and 30 on side walls 16 and 18, and offset parts 32 and 34 on side walls 17 and 19. Inasmuch as all of the offset parts are joined integrally with each other and to the side walls, the four offsets constitute a thickened part or enlargement of the upper edges of the walls of the container. The outer surface 36 of the offset is planar and extends outwardly from the general planes of the four side walls of container 10. The inner surface of each of the side walls of the container is unobstructed by the presence of the offset or bead. The top surface 40 of the offset and, consequently, the side walls are sloped downwardly and inwardly (Figures 5 and 6).

Cover 12 has a center panel 50 which is polygonal in order to be compatible with the shape of container 10. Rim 52 protrudes laterally from the perimeter of panel 50, and for the polygonal container 10, the rim has four parts 53, 54, 55 and 56, one being for each side wall of the container. The rim has four corners whose radius of curvature is the same as the radius of curvature of the rounded corners of the container 10. Rim 52 is formed with a laterally arranged groove 58 within which the offset at the upper extremity of each side wall is adapted to be fitted. Groove 58 has rim side walls 60 and 62 that are spaced at their lower extremities to form the entrance to groove 58 and these walls are joined by a smoothly curved top wall 66 in order to form the inner extremity of groove 58. As shown in Figure 3, the top wall 66 of the groove 58 is arched, with the highest part of the arch being between two adjacent owners of the container. Therefore, the four corners of the rim and, hence, the groove 58 rest on the sloped upper surface 40 at the corners of the container side walls But the rim and groove top wall rise gently toward a maximum which is at the medial part of the offset on the side wall between the container corners (Figure 3). Each of the four parts of the rim are constructed in the same way and for the dual purpose of forming a better seal and enabling the cover to be easily removed from the container.

Four inwardly extending ribs of small cross section are formed on the outer wall of the parts 53, 54, 55 and 56 of the rim 52 and extend inwardly of the groove 58. Typical rib 70 is shown on side wall 60 of rim 52 at a location approximately centrally between the upper and lower extremities thereof. Rib 70, and all other ribs like it, is smoothly curved or arched in approximate conformance to the arch of the top wall 66 of groove 58. The dimensioning of the bead at the top of each container side wall and the groove 58 is such with respect to the thickness of the container wall offset that when the cover is placed on the container, a line of localized, comparatively high pressure exists between the ribs and the outer surface 36 of the offset at the upper edges of the container walls. This causes the outer rim walls to be deflected outwardly very slightly (Figure 5) and to form a reaction in opposing wall 62 (Figure 5), bringing it firmly in contact with the inner, upper edge 74 of the container side wall 17 and corresponding edge of the other side walls of container 10. By having the upper surface 40 of the container side walls sloped (Figure 6), the outer edge 76 of the bead around the container mouth seats upon the junction of the top wall 66 and the side wall 60 of the rim 52 at the four corners of the container.

Cover 12 is applied to the container 10 in the expected manner. It is merely pressed gently thereon, with groove 58 accepting the offset at the mouth of the container. The four corners of cover 12 are brought down firmly on the corners of the side walls (Figure 6). Due to the arched configuration of grooves 58, the medial parts of the arches remain spaced from the upper surface 40 of the container side walls (Figures 3 and 5). Should an attempt be made to separate the cover by forcing upwardly at one of the arched parts of rim 52, difficulty would be encountered, as shown in Figure 7. The elastic and flexible side wall 60 will distort, and in order to remove the cover 12 in this matter, it would be necessary to actually peel the cover from the side walls much in the same way that commercially available covers are separated from their containers. However (Figure 2), by lifting gently at one of the corners, the cover is easily separated from its container. Where, as in Figure 7, any partial vacuum in the container remains and actually increases as the cover is pried from the container, initial lifting of the corner, as in Figure 2, completely destroys any partial vacuum within the container, facilitating removal of the cover.

When a force is applied to one of the corners of the cover as shown in Figure 2, the arched parts 56 and 55 have their center, deepest parts yield very easily, inasmuch as they move slightly downwardly, and the outer side walls distort outwardly slightly, enabling the ribless part of the groove 58 to slide smoothly across the outer surface of the offset. Continued application of force, as shown in Figure 2, will result in the separation of the entire cover 12 from the container.

It is understood that various departures and modifications may be made from the embodiment of the invention which is illustrated in the accompanying drawings. Therefore, limitation is sought only in accordance with the scope of the appended claims.

What is claimed as new is as follows:

1. In combination, a container having side walls and a flexible cover for the container, a rim at the edge of said cover and having a downwardly opening groove in which the upper edges of said side walls of the container are adapted to be fitted, said groove having an upper wall which is longitudinally arched, with the opposite ends of a pair of adjacent arched parts of the groove wall being adapted to seat on adjacent parts of the upper edges of a pair of said container walls to provide a flexure region in the rim of the cover between said opposite ends when separating the cover from the container.

2. The combination of claim 1 wherein said groove has side walls, a rib extending inwardly of said groove and located on one of said groove side walls and pressing against a surface of one of the container side walls and to form an area of comparatively high pressure for sealing purposes and bringing a part of the opposite groove side wall firmly against another part of said one of the container side walls to form an additional sealing area.

3. The combination of claim 2 wherein said rib has its ends terminating in spaced relationship to the ends of the arched top wall of the groove to facilitate the sliding of said ends of said arched groove from said container side walls.

4. In a container and closure wherein the container has side walls and the closure is made of a flexible synthetic resinous material, a closure panel constituting a part of said closure, a rim at the edge of said panel and provided with a downwardly opening groove in which the upper edges of said side walls are adapted to fit, said groove having a top wall with at least two longitudinal arches, the confronting ends of said arches terminating in spaced relationship to each other and forming an area which is adapted to come to bear against the upper edges of the side wall of the container when the closure is on said container whereby the intermediate parts of said two arches are deflected toward the upper edges of said container side walls in response to separation of said area of the groove from the upper edges of said container side walls.

5. In a container and closure wherein the container has side walls and the closure is made of a flexible synthetic resinous material, a closure panel constituting a part of said closure, a rim at the edge of said panel and provided with a downwardly opening groove in which the upper edges of said side walls are adapted to fit, said groove having a top wall with at least two longitudinal arches, the confronting ends of said arches terminating in spaced relationship to each other and forming an area which is adapted to come to bear against the upper edges of the side walls of the container when the closure is on said container whereby the intermediate parts of said two arches are deflected toward the upper edges of said container side walls in response to separation of said area of the groove from the upper edges of said container side walls, means in the groove and restricted to the arched parts of said groove for pressing against the outer surface of the upper parts of the container side walls and constituting a seal and also for pressing the opposing side walls of the arched parts of the groove against the opposite surface of the upper parts of the container side walls.

6. The container and closure of claim 5 wherein said means comprise elongated ribs which are arched with approximately the same curvature as the arched parts of said grooves.

7. A flexible container and cover for the container, said container being polygonal and having a plurality of side walls whose upper edge parts define the mouth of the container, a rim at the edge of said cover and having a groove within which the mouth of the container is accepted, the corners of said groove fitting on the corners of the polygonal container when the cover is seated on said container, and means forming a yielding hinge area on each side of each corner for deflecting comparatively easily in response to a force applied to any of the corners of the cover in a direction to separate any corner from the container, said means comprising raised parts of said groove between said corners providing additional space and material to facilitate hinged movement of the rim of the cover.

8. For use on a container that has side walls, a cover comprising a panel, a rim protruding laterally from said panel and located at the edge thereof, said rim having a groove with a container wall entrance at one end and being of flexible and elastic material, said groove having two longitudinal arches which are spaced from each other by a land portion, said land portion being at a corner of the cover and adapted to seat on the corner of two of the side walls of the container, and said arched parts being normally spaced from the upper edges of said side walls of the container and movable toward said upper edges of said side walls in response to movement of said land portion and corner from said container side walls, thereby facilitating the removal of said corner of the cover from the container.

9. For use on a container that has side walls, a cover comprising a panel, a rim protruding laterally from said panel and located at the edge thereof, said rim having a groove with a container wall entrance at one end and being of flexible and elastic material, said groove having two longitudinal arches which are spaced from each other by a land portion, said land portion being at a corner of the cover and adapted to seat on the corner of two of the side walls of the container, and said arched parts being normally spaced from the upper edges of said side walls of the container and movable toward said upper edges of said side walls in response to movement of side walls of the container and movable toward said walls, thereby facilitating the removal of said corner of the cover from the container, and means in said groove for establishing two spaced longitudinal sealing areas of contact between the inner surfaces of said groove and surfaces of said container side walls.

10. In combination with a container that has side walls provided with a bead at the upped edge thereof, a cover comprising a panel, a rim at the edge of said panel, said rim having a groove with side walls and a connecting wall, said rim being made of a flexible and elastic material, means in said groove and contacting said bead intermediate the upper and lower edges thereof for slightly distorting the side walls of said groove and the connecting wall thereof and for forming a seal at the point of contact and at an edge of said bead and another area of one of the side walls of said groove, said groove connecting wall being arched with the ends of the arch in contact with the upper surface of said bead to provide for flexure of said rim when an end part of the arch and the side walls of the rim which define the groove are lifted in a direction to separate the cover from the container.

11. The combination of claim 10 wherein said container has a corner formed by the junction of two of the side walls and said cover has in its rim a corner arranged to accept said corner of said container, a second arch spaced from the first mentioned arch and formed in said groove, one arch being at one side of said corner of said cover and the other arch being at the other side of said corner of said cover so that when said corner of said cover is separated from said corner of said container, both of the arched parts of the groove and the rim therearound yield and flex, enabling the cover to be separated from the container by first venting the container and then enabling the cover groove to be slid from said bead with said sealing means sliding from the surfaces of said bead.

12. In a container which has corners and side walls arranged to form the corners, the upper parts of said container walls being flat and smooth, a cover of flexible and elastic material and having a rim provided with a groove in which the upper parts of said side walls are adapted to fit, sealing means in said groove abutting one of the smooth surfaces of said side walls, and means in said rim and constituting parts of said groove for facilitating the removal of said cover from said container by readily flexing and yielding when a corner of the cover is forced off a corner of the container.

References Cited in the file of this patent
UNITED STATES PATENTS

| | | |
|---|---|---|
| 2,606,586 | Hill | Aug. 12, 1952 |
| 2,711,840 | Gits et al. | June 28, 1955 |
| 2,740,444 | Martinelli | Apr. 3, 1956 |
| 2,752,972 | Tupper | July 3, 1956 |